United States Patent [19]

McKay et al.

[11] Patent Number: 6,008,262
[45] Date of Patent: Dec. 28, 1999

[54] FOAMABLE COMPOSITIONS COMPRISING LOW VISCOSITY THERMOPLASTIC MATERIAL COMPRISING AN ETHYLENE α-OLEFIN

[75] Inventors: Kevin W. McKay; Eugene R. Simmons; Donald P. Woodbridge, all of St. Paul, Minn.

[73] Assignee: H.B. Fuller Licensing & Financing, Inc., St. Paul, Minn.

[21] Appl. No.: 08/913,456

[22] PCT Filed: Sep. 16, 1997

[86] PCT No.: PCT/US97/16422

§ 371 Date: Sep. 16, 1997

§ 102(e) Date: Sep. 16, 1997

Related U.S. Application Data

[63] Continuation-in-part of application No. 08/615,750, Mar. 14, 1996, abandoned.

[51] Int. Cl.⁶ ..................................................... C08L 23/04
[52] U.S. Cl. .................. 521/51; 521/60; 521/74; 521/84.1; 521/134; 521/142; 521/144; 526/330; 526/331; 526/352; 526/352.2
[58] Field of Search ..................................... 526/330, 331, 526/352, 352.2; 521/51, 60, 74, 84.1, 134, 142, 144

[56] References Cited

U.S. PATENT DOCUMENTS

| | | |
|---|---|---|
| 5,342,858 | 8/1994 | Litchholt et al. . |
| 5,369,136 | 11/1994 | Park et al. . |
| 5,389,168 | 2/1995 | Lichholt et al. . |
| 5,407,965 | 4/1995 | Park et al. . |
| 5,416,129 | 5/1995 | Chaudhary et al. ........................ 521/79 |

FOREIGN PATENT DOCUMENTS

| | | |
|---|---|---|
| 07188442 | 7/1995 | Japan . |
| WO 95/05418 | 2/1995 | WIPO . |

*Primary Examiner*—Nathan M. Nutter
*Attorney, Agent, or Firm*—Nancy N. Quan; Carolyn A. Fischer

[57] ABSTRACT

The present invention relates to a foamable composition comprising a low viscosity thermoplastic composition comprising at least one ethylene/α-olefin. The foamable composition may comprise a single ethylene/α-olefin or a blend of such. Optionally, the foamable composition may further comprise at least one diluent including waxes, plasticizers such as oil, tackifying resin, and mixtures thereof. The present invention also relates to a method of foaming such compositions and articles constructed therefrom. More specifically, the present invention relates to foamable thermoplastic compositions having particular utility as cabinet sealant and as foam layers in disposable articles such as disposable diapers, incontinent devices, medical devices such as bandages and dressings, as well as a variety of other uses.

22 Claims, No Drawings

FOAMABLE COMPOSITIONS COMPRISING LOW VISCOSITY THERMOPLASTIC MATERIAL COMPRISING AN ETHYLENE α-OLEFIN

RELATED APPLICATIONS

This application is a Continuation-in-part of patent application Ser. No. PCT/US97/04161 filed Mar. 14, 1997 which is a Continuation-in-part of patent application Ser. No. 08/615,750 filed Mar. 14, 1996 which is now abandoned.

FIELD OF THE INVENTION

The present invention relates to a foamable composition comprising a low viscosity thermoplastic composition comprising at least one ethylene/α-olefin. The foamable composition may comprise a single ethylene/α-olefin or a blend of such. Optionally the foamable composition may further comprise at least one diluent including waxes, plasticizers such as oil, tackifying resin, and mixtures thereof. The present invention also relates to a method of foaming such compositions and articles constructed therefrom. More specifically, the present invention relates to foamable thermoplastic compositions having particular utility as cabinet sealant and as foam layers in disposable articles such as disposable diapers, incontinent devices, medical devices such as bandages and dressings, as well as a variety of other uses.

BACKGROUND OF THE INVENTION

Cabinet sealant is used in the manufacture of appliances such as refrigerators, freezers and refrigerated vending machines. The sealant is foamed over all the holes, gaps, and spaces of the appliance housing, which typically comprises ABS plastic or painted metal, prior to filling the housing with urethane based insulation. The primary purpose of the sealant is to prevent the insulation from leaking out during the filling process. Further, the cabinet sealant must withstand temperatures ranging from about 60° C. (140° F.) to about 82° C. (180° F.) and gas pressures associated with the urethane insulation filling and foaming processes. It is difficult to cover all the holes and gaps in the appliance housing without also unintentionally over-spraying the foam onto the exterior of the appliance at visible locations. Accordingly, it is critical that the cabinet sealant be cleanly strippable from the appliance housing in order to easily remove the over-sprayed foam.

Other methods of sealing the appliance housing prior to filling with insulation include pliable permagum/duragum based mastics, masking tape, and foam/fiberglass pads coated with a pressure sensitive adhesive. Since these alternative methods are slow, costly and labor intensive, the method of sealing the appliance housing with a foamed sealant is far preferred.

Block copolymer based cabinet sealant, particularly S-EB-S based have been used extensively. Other block copolymers such as S-B-S and S-I-S are typically used to a lesser degree, as block copolymers having an unsaturated midblock tend to exhibit poor thermal stability. Such block copolymers are compounded with diluents such as oil and wax.

Amorphous polyalphaolefins (APAO's) are available in low viscosity versions. However, most compositions are not cleanly strippable from ABS plastic or painted metal due at least in part to the pressure sensitive nature of such compositions. To compensate for this disadvantage, formulators have attempted to dilute higher molecular weight APAO's with diluents such as oil and/or wax to lower the viscosity and reduce adhesion. These attempts have been unsuccessful in that the mixture once foamed lacks sufficient cohesive strength to be cleanly strippable. Accordingly, the use of APAO based compositions requires the use of solvent to remove the overspray.

Foams for disposable articles are often required to exhibit somewhat different properties than that of a foamable cabinet sealant. For example, U.S. Pat. Nos. 5,342,858 and 5,389,168 issued to Litchholt et al. are directed to an elastomeric adhesive foam comprising an A-B-A block copolymrer; an aromatic modified hydrocarbon resin; and optionally a processing oil. Columns 1 and 2 of the U.S. Pat. No. 5,342,858 patent discusses in detail the advantages of forming elastomeric foams on-line as well as the shortcomings of the prior art elastomeric adhesive compositions. Exemplified are adhesive compositions comprising 45 wt-% of an S-I-S block copolymer, 40 wt-% tackifying resin, and 15 wt-% oil having viscosities ranging from 11,125 cP to 34,000 cP at 163° C. (325° F.). Although the compositions of Litchholt represent an improvement in processability with respect to the prior art, the examples that were foamed, Examples 1 and 2 employ application temperatures of 163° C. (325° F.) and 191° C. (375° F.), respectively. High application temperatures are detrimental for several reasons. For example, high application temperatures can cause heat deformation of heat sensitive substrates, particularly of polyolefin films. Since thermoplastic compositions tend to have good insulating properties it is very difficult to sufficiently cool a mass of molten hot melt adhesive. This is especially true since gases tend to be even worse conductors of heat than thermoplastics, a foamed thermoplastic composition is even more difficult to cool. Also, poor foam quality due to remelting of the foam cell walls, and reduced line speeds due to the extended cooling times needed to sufficiently cool the foam can also result.

U.S. Pat. Nos. 5,369,136 and 5,407,965 issued to Park et al. teach an ethylenic polymer foam structure comprising an ethylenic polymer material. This reference is directed toward conventional extrusion foaming processes employing very viscous polymer in combination with a blowing or nucleating agent. Exemplified are ethylenic polymers having a low melt index ranging from 0.57 dg/min to 5.17 dg/min. Such polymers are too high in viscosity to be applied by hot melt adhesive foam applicators.

Therefore, industry would find advantage in a foamable composition comprising a low viscosity thermoplastic material exhibiting good thermal stability that may be applied at low application temperatures. The present inventors have found that certain metallocene polyolefins based compositions find utility as foamable cabinet sealant, in the manufacture of disposable articles for creating in-line foam layers, as well as for a variety of other uses.

SUMMARY OF THE INVENTION

The present invention is a foamable composition comprising a low viscosity thermoplastic composition comprising up to 100 wt-% of at least one ethylene/ α-olefin. A sufficient amount of gas is subsequently dispersed in said molten composition such that the composition foams, reducing the density to an amount ranging from about 20 wt-% to about 80 wt-%. In another embodiment, the foamable composition comprises from about 10 wt-% to about 80 wt-% of at least one metallocene polyolefin and at least one diluent selected from the group consisting of waxes, plasticizers such as oil, tackifiers, and mixtures thereof. In the case of elastomeric foams requiring a high level of retention in addition to cohesive strength, the foam preferably further comprises an elastomer such as a block copolymer.

Another aspect of the invention is to provide a low viscosity thermoplastic composition that is suitable for foaming on conventional hot melt adhesive application equipment. The resulting foam is white in appearance, relatively non-pressure sensitive and is particularly suitable for cabinet sealant applications.

Another aspect of the invention is to provide a neat uncompounded thermoplastic material, requiring no further compounding, that is suitable for foaming on conventional hot melt adhesive application equipment.

The foamable composition preferably has a viscosity less than about 30,000 cPs at 149° C. (300° F.) prior to foaming, more preferably less than about 20,000 cPs, and most preferably less than about 10,000 cPs, particularly for Foam-Melt ® type application equipment.

Another aspect of the invention is to provide a foamable composition having high heat resistance as reflected by a Mettler softening point of at least about 71 ° C. (1 60° F.) or greater, preferably greater than about 82° C. (1 80° F.), and more preferably greater than about 93° C. (200° F.).

Another aspect of the invention is to provide a thermoplastic composition that may be foamed in the absence of a nucleating agent or blowing agent. Since the thermoplastic compositions described herein are sufficiently low in viscosity, supersaturated solutions of gas and the molten thermoplastic compositions are easily achieved.

Another aspect of the present invention is to provide a method of foaming a thermoplastic composition wherein the composition is dispensed at a temperature less than 149° C. (300° F.), preferably less than 135° C. (275° F.), and more preferably, less than 121° C. (250° F.). Due to the relatively flat viscosity profile, particularly with respect to block copolymer based compositions, the compositions of the present invention are foamable at temperatures as low as about 5.6° C. (10° F.) above the softening point of the thermoplastic composition.

Another aspect is to provide a variety of articles utilizing such foamable compositions and/or employing such method. Certain ethylene/α-olefin based compositions find utility as foamed cabinet sealants. Such compositions exhibit excellent thermal stability and thus are low cost alternatives to the S-EB-S block copolymer based foamable cabinet sealant compositions. In contrast to the low viscosity APAO's, the resulting foam has sufficient cohesive strength and is cleanly removable from ABS plastic and painted metal. Such compositions may be used to form foam layers in-line in the assembly of disposable articles such as disposable diapers, feminine napkins, incontinent products, as well as a variety of medical devices such as bandages and dressings. The resulting foam may also be used in the manufacture of toys, therapeutic devices, as well as for a variety of vibration dampening and cushioning uses. Further, the low viscosity foamable composition may also be compounded in such a way that it exhibits elastomeric properties. In this instance, the foam may be applied in-line for applications that require elasticity, such as the elasticized leg and waist portions of disposable diapers.

DETAILED DESCRIPTION OF THE INVENTION

By "foam", it is meant a dispersion of gas in a molten thermoplastic material or the solidified molten thermoplastic material comprising a visible cell structure. By "closed cell" it is meant that each void created by the gas is completely surrounded by the thermoplastic composition. In contrast, an "open cell" is interconnected to at least one other cell. Typically, open cell foams are permeable via the cellular structure.

Metallocene polyolefins are homogeneous linear and substantially linear ethylene polymers prepared using single-site or metallocene catalysts have been recently introduced. Homogeneous ethylene polymers are characterized as having a narrow molecular weight distribution and a uniform short-chain branching distribution. In the case of substantially linear ethylene polymers, such homogeneous ethylene polymers are further characterized as having long chain branching. Substantially linear ethylene polymers are commercially available from The Dow Chemical Company as Affinity® polyolefin plastomers, which are produced using Dow's Insite ™technology. Homogeneous linear ethylene polymers are available from Exxon Chemical Company under the trade name Exact™ plastomers.

The foamable composition of the present invention comprises a low viscosity thermoplastic composition comprising at least one homogeneous ethylene/α-olefin interpolymer which is an interpolymer of ethylene and at least one $C_3$–$C_{20}$ α-olefin. The term "interpolymer" is used herein to indicate a copolymer, or a terpolymer, or a higher order polymer. That is, at least one other comonomer is polymerized with ethylene to make the interpolymer.

The homogeneous ethylene/α-olefin interpolymer is a homogeneous linear or substantially linear ethylene/α-olefin interpolymer. By the term "homogenous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer has a melting peak greater than 115° C. (such as is the case of polymers having a density greater than 0.940 $g/cm^3$), it does not additionally have a distinct lower temperature melting peak.

In addition or in the alternative, the homogeneity of the polymer may be described by the SCBDI (Short Chain Branching Distribution Index) or CDBI (Composition Distribution Breadth Index), which are defined as the weight percent of the polymer molecules having a comonomer content within 50% of the median total molar comonomer content. The SCBDI of a polymer is readily calculated from data obtained from techniques known in the art, such as, for example, temperature rising elution fractionation (abbreviated herein as "TREF"), which is described, for example, in Wild et al., Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.). The SCBDI or CDBI for the homogeneous ethylene/α-olefin interpolymers useful in the invention are preferably greater than 50%, more preferably greater than 70%, with SCBDI's and CDBI of greater than 90% being easily attained.

The homogeneous ethylene/α-olefin interpolymers useful in the invention are characterized as having a narrow molecular weight distribution ($M_w/M_n$). For the homogeneous ethylene/α-olefins useful in the foams of the invention, the $M_w/M_n$ is from 1.5 to 2.5, preferably from 1.8 to 2.2, most preferably about 2.0.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, and the like, the molecular weight distribution $M_w/M_n$. This feature accords substantially linear ethylene polymers with a high degree of processability despite a narrow molecular weight distribution.

It is noted that substantially linear interpolymers useful in the invention differ from low density polyethylene prepared in a high pressure process. In one regard, whereas low density polyethylene is an ethylene homopolymer having a density of from 0.900 g/cm$^3$ to 0.935 g/cm$^3$, the homogeneous linear and substantially linear interpolymers useful in the invention require the presence of a comonomer to reduce the density to the range of from 0.855 g/cm$^3$ to 0.910 g/cm$^3$.

The long chain branches of substantially linear ethylene interpolymers have the same comonomer distribution as the interpolymer backbone and can be as long as about the same length as the length of the interpolymer backbone. When a substantially linear ethylene/α-olefin interpolymer is employed in the practice of the invention, such interpolymer will be characterized as having an interpolymer backbone substituted with from 0.01 to 3 long chain branches per 1000 carbons. Methods for determining the amount of long chain branching present, both qualitatively and quantitatively, are known in the art.

The molecular weight of the ethylene/α-olefin interpolymer will be selected on the basis of the desired performance attributes of the foam formulation. Typically, however, the ethylene/α-olefin interpolymer will preferably have a number average molecular weight of at least 3,000, preferably at least 5,000. Typically, the ethylene/α-olefin interpolymer will preferably have a number average molecular weight of no more than 100,000, more preferably no more than 60,000, and even more preferably less than 40,000.

When the ethylene/α-olefin interpolymer has an ultra-low molecular weight, and the like, a number average molecular weight less than 11,000, the ethylene/α-olefin interpolymer leads to a low polymer viscosity but is characterized by a peak crystallization temperature which is greater than that of corresponding higher molecular weight materials of the same density. In foam applications, the increase in peak crystallization temperature translates to an increased heat resistance. Ultra-low molecular weight ethylene/α-olefin interpolymers are more fully described below.

The density of the ethylene/α-olefin interpolymer will likewise be selected on the basis of the desired performance attributes of the foam formulation. In the case where the ethylene/α-olefin interpolymer is compounded with additional ingredients such as waxes, plasticizers, and tackifiers, the ethylene/α-olefin interpolymer will have a density of at least 0.850 g/cm$^3$, preferably at least 0.860 g/cm$^3$, and more preferably at least 0.870 g/cm$^3$. Typically, the ethylene/α-olefin interpolymer will have a density of no more than 0.965 g/cm$^3$, preferably no more than 0.910 g/cm$^3$, more preferably no more than 0.900 g/cm$^3$, and even more preferably no more than 0.880 g/cm$^3$, and most preferably no more than 0.875 g/cm$^3$.

Alternatively, when employing the ethylene/α-olefin neat or uncompounded, the ethylene/α-olefin will preferably have a density ranging from about 0.870 g/cm$^3$ to about 0.900 g/cm$^3$ and most preferably ranging from about 0.880 g/cm$^3$ to about 0.890 g/cm$^3$.

In the case of compounded compositions, the ethylene/α-olefin interpolymer will be present in the foamable compositions of the invention in an amount of at least 5 wt-%, and preferably greater than 10 wt-%. The ethylene/α-olefin interpolymer will typically be present in the foamable composition of the invention in an amount of not more than 95, typically not more than 80, and preferably ranging from about 10 wt-% to about 40 wt-%.

The foamable composition may comprise a single homogeneous ethylene/α-olefin interpolymer. In such an embodiment, the homogeneous ethylene/α-olefin interpolymer will preferably have a density ranging from about 0.865 g/cm$^3$ to about 0.890 g/cm$^3$. When it is desired to prepare a foam formulation with a minimal concentration of the homogeneous linear or substantially linear interpolymer, and the like, foam formulations containing less than 30 wt-%, preferably less than 25 wt-% of the homogeneous ethylene/α-olefin interpolymer are used and the melt index ($I_2$ at 190° C.) of the homogeneous linear or substantially linear interpolymer will be preferably about 500 or less, more preferably about 30 or less, and most preferably less than 10 g/10 min. It is surmised that compounded foamable compositions comprising as little as 5 wt-% of the homogeneous ethylene/α-olefin interpolymer having a melt index less than about 0.5 g/10 min. would be useful.

In the case of pressure sensitive foams and/or elastomeric foams, preferred foamable compositions will comprise from about 5 wt-% to about 50 wt-%, preferably from about 10 wt-% to about 40 wt-%, more preferably from about 10 wt-% to about 30 wt-% of a single homogeneous ethylene/α-olefin interpolymer. For other applications, the homogeneous linear or substantially linear interpolymer may be employed at concentrations greater than about 30 wt-%.

In another embodiment, a first homogeneous ethylene/α-olefin interpolymer may be blended with a second homogeneous ethylene/α-olefin interpolymer, wherein the first and second interpolymers differ in number average molecular weight by at least about 5000, preferably at least about 10,000, and more preferably at least about 20,000. In this embodiment, the combination of the lower molecular weight and higher molecular weight components will tend to yield an intermediate storage modulus at 25° C. and an improved probe tack.

In addition or in the alternative, the first homogeneous ethylene/α-olefin interpolymer may be blended with a second homogeneous ethylene/α-olefin interpolymer, wherein the first and second interpolymers differ in density by at least about 0.005 g/cm$^3$, preferably by at least about 0.01 g/cm$^3$. In this embodiment, particularly in the case of pressure sensitive adhesive foams, as the density differential increases, the relative proportion of the higher density interpolymer will typically decrease, as the increased levels of crystallinity would otherwise tend to decrease storage modulus at 25° C. and probe tack to levels which would render them unsuitable for use as pressure sensitive adhesive foams.

In one embodiment, the foamable composition will comprise a blend of two homogeneous ethylene/α-olefin, the first interpolymer having a density of about 0.870 g/cm$^3$ or less and the second interpolymer having density greater than about 0.900 g/cm$^3$. When high cohesive strength is desired, the first and second homogeneous linear or substantially linear interpolymer, will preferably both have relatively low melt indices, such as an $I_2$ of less than about 30 g/10 min. In contrast, for lower viscosity adhesive compositions, especially those which are foamable at temperatures less than about 163° C. (325° F.), the second homogeneous ethylene/α-olefin interpolymer will have a greater density than the first homogeneous ethylene/α-olefin interpolymer, and will preferably have a melt index greater than about 125, more preferably greater than about 500, and most preferably greater than about 1000 g/10 min.

As used herein, the term "tackifier" means any of the compositions described below which are useful to impart tack to the hot melt adhesive composition. ASTM D-1878-61T defines tack as "the property of a material which enables it to form a bond of measurable strength immediately on contact with another surface".

The foamable composition of the invention may comprise from about 0 wt-% to about 75 wt-% of a tackifying resin. Typically, and particularly when it is desired to employ less than about 30 wt-% of the homogeneous ethylene/α-olefin interpolymer, the foamable composition will comprise from about 20 wt-% to about 60 wt-%, more typically from about 30 wt-% to about 60 wt-% tackifier.

In the alternative, in cases where it is desirable to employ at least about 30 wt-% of the homogeneous ethylene/α-olefin interpolymer, the present invention advantageously provides foamable formulations which contain minimal tackifier, and the like, less than about 30 wt-% tackifier, preferably less than about 25 wt-% tackifier, more preferably less than about 20 wt-% tackifier, and most preferably less than about 15 wt-% tackifier. In such applications, the homogeneous ethylene/α-olefin interpolymer will preferably be provided as a blend with a second homogeneous ethylene/α-olefin interpolymer. In such instances, foamable compositions containing less than about 10 wt-% tackifier, and even foams having no tackifier, exhibit adequate hot tack.

In general terms, tackifying resins are useful in the foam of the invention. Tackifying resins comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the foams of this invention. Representative examples of useful hydrocarbon resins includes alpha-methyl styrene resins, branched and unbranched $C_5$ resins, $C_9$ resins, $C_{10}$ resins, as well as styrenic and hydrogenated modifications of such. Tackifying resins range from being a liquid at 37° C. to having a ring and ball softening point of about 135° C. Solid tackifying resins with a softening point greater than about 100° C., more preferably with a softening point greater than about 130° C. are particularly useful to improve the cohesive strength of the adhesives of the present invention, particularly when only a single homogeneous ethylene/α-olefin interpolymer is utilized.

For the foamable composition of the invention, the preferred tackifying resin is predominantly aliphatic. However, tackifying resins with increasing aromatic character are also useful, particularly when a second tackifier or mutually compatible plasticizer is employed.

A plasticizer is broadly defined as a typically organic composition that can be added to thermoplastics, rubbers and other resins to improve extrudability, flexibility, workability, or stretchability. In preferred embodiments of the invention, the plasticizer will be provided to the foamable composition in amounts up to about 90 wt-%, preferably ranging from about 40 wt-% to about 60 wt-% for foamable thermoplastic composition having relatively low peel strength. In the case of foamable compositions having a high degree of pressure sensitivity, the plasticizer is preferably less that about 30 wt-%. The plasticizer may be either a liquid or a solid at ambient temperature. Exemplary liquid plasticizers include hydrocarbon oils, polybutene, liquid tackifying resins, and liquid elastomers. Plasticizer oils are primarily hydrocarbon oils which are low in aromatic content and which are paraffinic or napthenic in character. Plasticizer oils are preferably low in volatility, transparent and have as little color and odor as possible. The use of plasticizers in this invention also contemplates the use of olefin oligomers, low molecular weight polymers, vegetable oils and their derivatives and similar plasticizing liquids.

When a solid plasticizing agent is employed, it will preferably have a softening point above about 60° C. It is believed that by combining the homogeneous ethylene/α-olefin interpolymer with a suitable tackifying resin and a solid plasticizer such as a cyclohexane dimethanol dibenzoate plasticizer, the resulting adhesive composition may be applied at temperatures below about 120° C., preferably below about 100° C. Although a 1,4-cyclohexane dimethanol dibenzoate compound commercially available from Velsicol under the trade name Benzoflex™ 352 is exemplified, any solid plasticizer that will subsequently recrystallize in the compounded thermoplastic composition is suitable. Other plasticizers that may be suitable for this purpose are described in EP 0422 108 B1 and EP 0 410 412 B1, both assigned to H.B. Fuller Company.

Waxes may be usefully employed in the foam compositions of the present invention, particularly when the foam composition is intended to be relatively tack free upon cooling and solidifying, such as the foamable cabinet sealant. Waxes are commonly used to modify the viscosity and reduce tack at concentrations up to about 50 wt-%, preferably less than about 30 wt-%. Waxes useful in the foamable compositions of the present invention include paraffin waxes, microcrystalline waxes, Fischer-Tropsch, polyethylene and by-products of polyethylene wherein $M_w$ is less than about 3000. More preferably, the concentration of wax is less than about 25 wt-% for high melt point waxes. At wax concentrations above about 25 wt-%, paraffin waxes are typically used.

Also suitable are ultra-low molecular weight ethylene/α-olefin interpolymers prepared using a constrained geometry catalyst, and may be referred to as homogeneous waxes. Such homogeneous waxes, as well as processes for preparing such homogeneous waxes, are set forth in the examples below. Homogeneous waxes, in contrast to paraffinic waxes and crystalline ethylene homopolymer or interpolymer waxes, will have a $M_w/M_n$ of from about 1.5 to about 2.5, preferably from about 1.8 to about 2.2.

Homogeneous waxes will be either ethylene homopolymers or interpolymers of ethylene and a $C_3$–$C_{20}$ α-olefin. The homogeneous wax will have a number average molecular weight less than about 6000, preferably less than about 5000. Such homogeneous waxes will typically have a number average molecular weight of at least about 800, preferably at least about 1300.

Homogeneous waxes lead to a low polymer and formulation viscosity, but are characterized by peak crystallization temperatures which are greater than the peak crystallization temperatures of corresponding higher molecular weight materials of the same density. In foam applications, the increase in peak crystallization temperature translates to an increased heat resistance, and the like, improved creep resistance in pressure sensitive adhesive foam, and improved shear adhesion failure temperatures (SAFT) in hot melt adhesive foams.

As is known in the art, various other components can be added to modify the tack, color, odor, etc., of the foamable thermoplastic composition. Additives such as antioxidants (for example, hindered phenolics (for example, Irganox™ 1010, Irganox™ 1076), phosphites (for example, Irgafos™ 168)), antiblock additives, pigments, and fillers, can also be included in the formulations. It is generally preferred that the additives should be relatively inert and have negligible effects upon the properties contributed by the homogeneous linear or substantially linear interpolymer, tackifying agent, and plasticizer.

The following tables depict the useful, preferred, and most preferred concentration of ingredients for substantially nontacky foams such as cabinet sealants as well as for pressure sensitive and elastomeric foams. ASTM D1878-61T defines tack as "the property of a material which enables it to form a bond of measurable strength immediately on contact with another surface." The foams of the present invention exhibit hot tack. Hence, "nontacky" in the context of the present invention refers to the lack of ability to form a bond of measurable strength after the foam has cooled.

TABLE I

Compounded Foams

| | Useful | Preferred | Most Preferred |
|---|---|---|---|
| Metallocene Polyolefin (wt-%) | 10–80 | 15–35 | 20–30 |
| Melt Index (g/10 min) | 0.01–500 | 0.5–125 | 0.5–30 |
| Density(g/cm$^3$) | .850–.965 | .860–.910 | .870–.900 |
| Plasticizer (wt-%) | 0–90 | 10–70 | 40–60 |
| Wax (wt-%) | 0–50 | 10–30 | 15–25 |
| Tackifier (wt-%) | 0–15 | | |

TABLE II

Uncompounded Foams

| | Useful | Preferred | Most Preferred |
|---|---|---|---|
| Metallocene Polyolefin (wt-%) Melt Index (g/10 min) | 100% | | |
| Viscosity @ Application Temperature for Foam Melt ® | <50,000 cPs | <30,000 cPs | <20,000 cPs |
| Density (g/cm$^3$) | 0.865–0.905 | 0.870–0.900 | 0.880–0.890 |

TABLE III

Pressure Sensitive & Elastomeric Compounded Foams

| | Useful | Preferred | Most Preferred |
|---|---|---|---|
| Metallocene Polyolefin (wt-%) | 5–50 | 10–40 | 10–30 |
| Melt Index (g/10 min) | 0.5–50 | 0.5–30 | 10–30 |
| Density (g/cm$^3$) | .850–.890 | .865–.885 | |
| Tackifier | 10–75 | 20–60 | 30–60 |
| Plasticizer | 10–90 | 10–60 | 10–30 |
| Block Copolymer | 0–25 | 0–20 | 0–10 |
| Wax | 0–15 | 0–10 | 0–5 |

Tradenames and description of ingredients employed in the inventive and comparative examples.

TABLE IV

Ingredients

| Ingredient | Description | Supplier |
|---|---|---|
| Insite EG 8100 | MI = 1 g/10 min, D = .870 | Dow |
| Insite EG 8200 | MI = 5 g/10 min, D = .870 | Dow |
| Exact 5008 | MI = 10 g/10 min, D = .865 | Exxon |
| Insite SM 8400 | MI = 3- g/10 min, D = .870 | Dow |
| Paraflint H4 | 225 F Fischer Tropsch Wax | Moore & Munger |
| PX-100 HMP Wax | 225 F Fischer Tropsch Wax | Bareco |
| Kaydol oil | white mineral oil | Witco |
| Irganox 1010 | hindered phenol antioxidant | Ciba-Giegy |
| Epolene C-10 | low density polyethylene | Eastman |
| Rextac 2715 | ethylene-propylene APAO | Rexene |
| 500 oil | napthenic oil | Penzoil |
| Marcus 200 | wax | Marcus |
| Okerin 236TP | 68° C. (155° F.) paraffin wax | Astorwax |

The foamable composition preferably has a viscosity less than about 50,000 cPs at 135° C. (275° F.), preferably less than about 30,000 cPs, and more preferably less than about 10,000 cPs particularly for FoamMelt® type application equipment. However, in the case of Foam®Mix type application equipment, the thermoplastic composition may have a viscosity as high as 100,000 cPs at application temperature.

Another aspect of the invention is to provide a foam having high heat resistance as reflected by a Mettler softening point ranging from about 71° C. (160° F.) to about 132° C. (270° F.), preferably ranging from about 82° C. (180° F.) to about 116° C. (240° F.), and more preferably ranging from about 93° C. (200° F.) to about 110° C. (230° F.) or greater.

The low viscosity foamable compositions of the invention may be prepared by standard melt blending procedures. In particular, the first polymer(s), tackifier(s), and optional plasticizer(s) may be melt blended at an elevated temperature (from 150° C. to 200° C.) under an inert gas blanket until a homogeneous mix is obtained. Any mixing method producing a homogeneous blend without degrading the hot melt components is satisfactory, such as through the use of a heated vessel equipped with a stirrer.

Further, the homogeneous ethylene/α-olefin interpolymer (s), optional tackifier(s) and optional plasticizer(s) may be provided to an extrusion coater for application to the substrate.

When the ethylene/α-olefin interpolymer is a blend of two or more ethylene/α-olefin interpolymers, it will be preferred to prepare the foamable pressure sensitive adhesive compositions using a dual reactor configuration, with one of the polymers being produced in the first reactor, the other of the polymers being produced in a second reactor, and the tackifier(s) and optional plasticizer(s) being optionally provided, typically at a point after the second reactor, via a side-arm extruder. In this embodiment, foamable pressure sensitive compositions can be provided in forms such as pellets, pillows, or any other desired configuration. Examples of such a process which may be adapted in accordance with the teachings of this disclosure to prepare blends of a homogenous linear (higher molecular weight or ultra-low molecular weight) or substantially linear ethylene/α-olefin interpolymer, wax, and optional tackifier, are disclosed in WO 94/00500 and WO 94/01052.

The low viscosity foamable compositions of the present invention can be applied by any equipment suitable for foaming hot melt adhesive compositions. Further, other types of equipment such as the Control-Coat™ hot melt adhesive application equipment available from the Nordson Corporation of West Lake, Ohio tend to incorporate significant amount of air resulting in a foam-like structure.

The foams of the present invention are generally formed by first melting the thermoplastic composition described herein. The thermoplastic composition is typically melted by heating the composition to a temperature of about 79° C. (175° F.) to about 204° C. (400° F.), preferably at temperatures of less than about 149° C. (300° F.), more preferably at temperatures of less than about 135° C. (275° F.) and most preferably at temperatures of less than about 121° C. (250° F.). Lower application temperatures are advantageous for several reasons, including reduced risk of burns to the foam equipment operators, reduced tendencies of heat induced film distortion, all well as improved line-speed efficiencies due to the reduced cooling times.

The molten thermoplastic composition is then mixed under sufficient pressure with a suitable gas to form a solution or dispersion of the gas in the molten thermoplastic composition, thus forming a foamable mixture or solution. Upon a sufficient reduction in pressure, as is caused by dispensing the mixture at atmospheric pressure, the gas evolves from and/or expands in the solution in the form of bubbles in the molten thermoplastic composition to form a structure comprising the thermoplastic composition and cells. The structure is stabilized by cooling to form a foam structure that is relatively permanent at room temperature.

The gas is preferably non-reactive, particularly non-oxidative. Thus various gases may be employed including nitrogen, carbon dioxide, inert gases such as argon and helium, and mixtures of such. Although oxidative gases such as air are typically not preferred, the thermoplastic compositions of the present invention are very heat stable and foamable and relatively low application temperatures. Thus, the inventors surmise that air may be used as the gas in foaming such compositions with minimal concerns regarding oxidative stability.

It is often desired to minimize the foam density and thus to maximize the amount of gas in the solution for economic and other reasons, e.g., to maximize caliper. Thus, the amount of gas which is incorporated into the molten elastomeric adhesive material may be selected so as to provide a foam having desired density or caliper. However, since the foam modulus tends to decrease with decreasing foam density (and thus with increasing gas loading) the desired density should be balanced with the desired modulus. Typically, at least about 25 volume-%, more preferably at least about 50 volume-% of gas is incorporated into the thermoplastic composition. About 65 volume-% to about 75 volume-% gas tends to provide a suitable balance of foam density, caliper, and modulus. The resultant foams typically have, respectively, a void volume or a "density reduction" of at least about 20% to about 25%; preferably about 40% to about 50%; more preferably at least about 50% to about 65%; and most preferably about 60% to about 80%. In general, it is noted that the foam hardness decreases as the density of the ethylene/α-olefin interpolymer decreases. Further, the density reduction of the foam appears to be slightly diminished upon employing lower density ethylene/α-olefin interpolymers.

The pressure under which the thermoplastic composition is maintained to form a solution is preferably at least about as great as the critical solubility pressure of the particular gas in the thermoplastic compositions at a given temperature. "Critical solubility" means the pressure at which the gas in solution will begin to evolve out of solution, The critical solubility pressure is typically the same as or near the thermodynamic equilibrium solubility pressure.

Upon a sufficient reduction in pressure, as is caused by releasing the mixture at atmospheric pressure, the gas evolves from and/or expands in the solution in the form of bubbles in the molten thermoplastic composition to form a structure comprising a foam. The solution is typically caused to foam by decreasing the pressure to a point below the critical solubility pressure. It is typically desirable to avoid the reduction of pressure until the desired point of discharge. If the critical solubility pressure is reached before this point, there may be a loss of gas resulting in a decreased caliper. It is believed that, if the critical solubility pressure is reached before discharge, the wall shear exerted by a typical fluid transport system causes the bubbles flowing near the walls of the dispensing device to elongate and weaken. As a result, bubbles can burst upon exiting the device such that gas is lost and there is a decrease in caliper and an increase in density (basis weight). An increased number of open cells relative to closed cells may also result. Further, when high temperatures are employed the foam is more prone to collapsing due to the dissipation of heat causing remelting of the cell walls.

A suitable method of incorporating the gas into the thermoplastic material utilizes the FoamMix® system available from the Nordson. This system is described in detail in U.S. Pat. No. 4,778,631, issued to Cobbs Jr., et al., on Oct. 18, 1988; and U.S. Pat. No. 5,056,034, issued to Rucki, et al. on Oct. 8, 1991. With such a system, the thermoplastic composition may be mixed with gas to provide a molten thermoplastic/gas solution under pressure such that when the adhesive/gas solution is subsequently discharged at atmospheric pressure, the gas is released from the solution and becomes entrapped in the thermoplastic material to form a relatively homogeneous foam. In the FoamMix® system, mixing is accomplished by force feeding the gas and molten thermoplastic material into and through a low energy input disc mixer with a low pressure drop across the mixer such that premature foaming of the thermoplastic material is prevented or minimized. The disc mixer includes a tubular housing, one or more disc drives shafts extending along the length of the housing, and a series of discs spaced along the shafts. The gas enters into solution with the thermoplastic mixture in the compartments between the rotating discs. The overall all pressure drop of the system is kept sufficiently low relative to the temperature increase of the material to maintain the gas in solution through the system and up to the dispensing device, e.g., valved nozzle, to avoid foaming of the material prior to discharge. A sufficient pressure differential across the dispensing device is provided to maintain the gas in solution prior to discharge, yet permit foaming after discharges at atmospheric pressure.

A preferred system for dispensing foamable thermoplastic compositions is the FoamMelt® system available from Nordson Corp. This system is described in U.S. Pat. No. 4,679,710, issued to Jameson et al. on Jul. 14, 1987. The Nordson FoamMelt® application system is a process by which an inert gas is mechanically combined with a hot melt material and held in solution, much like a carbonated beverage under pressure in its shipping container. When this material is exposed to atmospheric pressure and deposited onto a substrate, the gas expands, producing foam.

Hot melt material is placed into the melt tank at a specified temperature. The molten hot melt material is then fed into a constant displacement, two-stage gear pump where it is mixed with the inert gas (nitrogen). The Foam- Melt® gear pump system consists of a pair of standard gear pumps stacked one on top of the other. The first stage (upper level) of the pump meters in the hot melt material from the melt tank into the second stage (lower level). The inert gas is injected at low pressure (3–5 psi) into the gear pump. Gear rotation creates a vacuum that in turn draws the inert gas into the second stage gear set and mixes the gas with molten hot melt material. As the gas/hot melt mixture moves towards the pump discharge port, hydraulic pressure in the pump increases, which forces the gas into solution with the hot melt material to form a single state material. Nordson has added a series of mixing slots cut into the plates above and below the second stage gear teeth to aid in the mixing process.

From the gear pump, the gas/hot melt mixture enters the manifold where it flows through the density control/filter assembly, which filters the mixture of any char and measures the gas to hot melt ratio. The density control/filter assembly controls a valve that directs the actual flow of gas into the system. The gas/hot melt mixture exits the density control/filter assembly and enters one or more heated supply hoses. The gas/hot melt material circulates through the automatic or hand-operated extrusion guns attached to the end of the supply hoses. Triggering the gun forces the gas/hot melt material out onto the desired substrate forming a foamed material. Undispensed material re-enters the manifold via heated return hoses. A pressure control valve maintains system hydraulic pressure on the return port.

The foam is stabilized by cooling the molten material. A significant advantage of the thermoplastic compositions described herein is that they may be foamed at significantly lower application temperatures and thus, may be sufficiently cooled at ambient temperature. Accordingly, external cooling means are not needed. Further, deformation of heat sensitive substrates, such as polyolefin films used in the assembly of disposable absorbent articles is also minimized. However, if higher application temperatures are desired, the cellular structure may be cooled by external means, e.g. chill rolls. It is generally desired to immediately form a skin on the foam surfaces by cooling just the outside surfaces in order to prevent or minimize gas loss. If a skin is desired, which is substantially free of a visible cell structure, the foamable composition can be applied at higher temperature and or heat may be applied to the outer surface to remelt or inhibit the formation of a cell structure on the surface. However, sufficient time should be allowed for the gas bubbles to grow substantially to their maximum size at standard temperature and pressure (i.e., the gas is at or near its equilibrium pressure at standard temperature and pressure). If the thermoplastic composition sets prior to such growth, there may later be an apparent gas loss resulting from the pressure exerted by the gas entrapped in closed cells. It is believed that this pressure may be sufficient to cause diffusion of the gas out of the foam structure such that the cellular structure and physical properties of the foam change over time. Typically, sufficient time is provided by allowing about 2 seconds, before cooling and any compression.

In addition, it is usually desired to form and stabilize the foam structure in the substantial absence of compressive forces (e.g., compression or tension). Such forces may limit the growth of the gas bubbles resulting in reduced caliper and a change in other physical properties. For example, tensioning rolls and combining rolls such as are typically used in commercial laminating equipment may cause compressive forces. Therefore, lamination preferably occurs after the foam structure has solidified. Alternatively, lamination may occur before cooling provided the process is carefully engineered to avoid compression during solidification. For example, the clearance of the combining rolls may be set to the loft of the unsolidified foam existing at the time the laminae pass through the combining rolls.

The gas/molten thermoplastic composition is typically applied to a substrate upon which foaming is desired to occur. Alternatively, the gas/molten thermoplastic composition may be first applied to a temporary or carrier substrate and then subsequently affixed or transferred onto the intended substrate.

In the case of cabinet sealant the gas/molten thermoplastic composition is foamed over all the holes, gaps, and spaces of an appliance housing, which typically comprises ABS plastic or painted metal, prior to filling the housing with urethane based insulation. Further, the cabinet sealant must withstand temperatures ranging from about 60° C. (140° F.) to 82° C. (180° F.) and gas pressures associated with the urethane insulation filling and foaming processes. The primary purpose of the sealant is to prevent the insulation from leaking out during the filling process. It is difficult to cover all the holes and gaps in the appliance housing without also unintentionally over-spraying the foam onto the exterior of the appliance at visible locations. Accordingly, it is critical that the cabinet sealant be cleanly strippable from the appliance housing in order to easily remove the over-sprayed foam. This property is achieved by selecting an appropriate uncompounded ethylene/α-olefin interpolymer or formulating such interpolymer such that the cohesive strength of the foamed composition exceeds the adhesive force to the appliance housing. The foamable composition must also exhibit sufficient hot tack to adhere to the appliance housing when applied and the resulting foam must not prematurely fall off the appliance housing prior to being purposely stripped off.

The foams of the present invention are also useful when joined to a carrier, and are particularly useful for imparting elastomeric properties to the carrier. Alternatively, the foam may be relatively non-elastomeric and/or relatively non-tacky and serve primarily as a compression of gasketing layer to improve comfort or containment. The carrier may be any carrier as are known in the art for absorbent disposable articles such as non-woven webs, apertured polymeric webs, and polymer films. Suitable carriers include any of the top sheet (body-fluid permeable layer), backsheet (typically body fluid impermeable layer) or absorbent core material described in the art for use in absorbent articles. The carrier may be of any desired shape and may be shaped before, during or after joined with the foam.

The compositions of the present invention may also find utility in vibration dampening application for isolation of acoustical and mechanical noise, as antivibration or cushioning materials for transporting shock sensitive devices, as articles for use in medical and sport health care such as therapeutic hand exercising grips, crutch cushions, neck cushions, elbow padding, dermal pads, wheel chair cushions, helmet liners, hot and cold packs, exercise weight belts, traction pads and belts, cushions for splints, slings and braces, soles and/or inserts for shoes. Other uses include toys and sporting goods such as fishing baits.

For disposable articles the foam may be shaped during and/or after its formation. Shaping may be achieved by any conventional shaping technique as is known in the art to form a foam having a defined shape and size. Preferred methods for shaping foam include casting, molding or forming operation. Casting and molding techniques generally involve introducing the gas/molten thermoplastic composition mixture into a prepared cavity or onto a substrate rendering the pressure such that the foam expands into the shape of the mold cavity or substrate. Examples of specific molding techniques involve performing various operations on the gas/molten thermoplastic composition or foam to modify its shape and/or size. Examples of specific forming techniques for use herein include coating, extruding, and lamination operations. For examples, the gas/molten thermoplastic mixture may be dispensed through an orifice to form a foam having a shape corresponding to the shape of the orifice. In addition, the foam shape can be controlled by using an intermittent nozzle or a row of intermittent nozzles of a variety of shapes (e.g., slot or bead). By turning selected nozzles on and off over the substrate passing below, a multitude of two-dimensional pattern or shapes can be made. Further, the gas/molten thermoplastic solution may be cast on a surface to form a foam having a desired shape or surface morphology. Any or all of these techniques may also be used in combination to form the shaped foam. Any suitable apparatus as are known in the art may be used to carry out such operations.

The resultant gas/molten thermoplastic foam in an uncompressed state can be described as a relatively homogeneous dispersion of a gas and a thermoplastic material. The gas can be dispersed to form closed and/or open cells. The foam may be further characterized by a cell ratio, i.e., the percent open cells/percent closed cells. The cell ratio and other features can impact other properties of the foam including caliper, elongation force, compressibility, and resilience.

The cell ratio can be varied by changing the percent of gas incorporated into the molten thermoplastic compositions. The cell ratio may also vary with the viscosity, and thus temperature, of the gas/molten thermoplastic composition solution. For a given viscosity and temperature, the cell ratio tends to increase with an increase in gas loading (volume % or fraction). For a given gas loading, the greater the viscosity or the lower the temperature, the greater the tendency for closed cells to form such that the cell ratio decreases.

For foams intended as elastomeric foams for use in absorbent articles, it is generally preferred that the foam have a caliper of from about 25 mils (625 g/sm) to about 60 mils (1500 g/sm), preferably from about 35 mils (875 g/sm) to about 45 mils (1125 g/sm). Foams having such calipers are believed to aid in providing sufficient stiffness to prevent or minimize rolling and/or creasing of structures incorporating the foam. In addition, these calipers provide a desirable aesthetic effect in article incorporating the same. Further, such foams are characterized as having sufficient elongation and recovery forces, typically have an elastomeric retention value of at least 65%.

The invention is further illustrated by the following non-limiting examples.

EXAMPLES

Test Methods

Density is measured in accordance with ASTM D-792. The samples are annealed at ambient conditions for 24 hours before the measurement is taken.

Melt index ($I_2$, is measured in accordance with ASTM D-1238, condition 190° C./2.16 kg (formally known as "Condition (E)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 wt-% solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a * (M_{polystyrene})^b.$$

In this equation, a =0.4316 and b =1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the with fraction eluting from the GPC column.

Melt Viscosity is determined in accordance with the following procedure using a Brookfield Laboratories DVII+ Viscometer in disposable aluminum sample chambers. The spindle used is a SC-27 hot-melt spindle, suitable for measuring viscosities in the range of from about 10 to about 100,000 centipoise. The sample is placed in the chamber, which is in turn inserted into a Brookfield Thermosel and locked into place. The sample chamber has a notch on the bottom that fits the bottom of the Brookfield Thermosel to ensure that the chamber is not allowed to turn when the spindle is inserted and spinning. The sample is heated to the desired temperature, with additional sample being added until the melted sample is about 1 inch (2.5 cm) below the top of the sample chamber. The viscometer apparatus is lowered and the spindle submerged into the sample chamber.

Lowering is continued until brackets on the viscometer align on the Thermosel. The viscometer is turned on, and set to a shear rate which leads to a torque reading in the range of 30% to 60%. The reading is taken after about 30 minutes, or after the value has stabilized.

Mettler Softening Point is measured in accordance with ASTM D-3461.

Foam Density Reduction is determined by filling a container with unfoamed hot melt adhesive to a predetermined volume. The hot melt adhesive is then foamed into a comparable container to the same predetermined volume. Both samples are weighed and then the foam density reduction is calculated according to the following equation:

$$\% \text{ Density Reduction} = \frac{\text{unfoamed weight} - \text{foamed weight}}{\text{unfoamed weight}} \times 100$$

Foam Aging is determined by placing the foam filled container used for determining the density reduction in a 66° C. (150° F.) oven for 24 hours. The samples are then removed and subjectively evaluated by pressing a finger into the heated sample for foam retention and rebound.

Strippability is determined by foaming the composition onto ABS and painted metal. After cooling for 24 hours the foam is removed. Foam that can be removed without tearing or leaving a residue is characterized as being "strippable".

Polymerization of Ultra-Low Molecular Weight Polymers and Waxes

Catalyst Preparation One

Part 1: Preparation of TiCl$_3$(DME)$_{1.5}$

The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5 L). In the drybox, 700 g of TiCl$_3$ was weighed into an equalizing powder addition funnel; the funnel was capped, removed from the drybox, and put on the reaction kettle in place of the stopper. The TiCl$_3$ was added over about 10 minutes with stirring. After the addition was completed, additional DME was used to wash the rest of the TiCl$_3$ into the flask. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The TiCl$_3$(DME) 1.5 was left in R-1 as a pale blue solid.

Part 2: Preparation of [(Me$_4$C$_5$)SiMe$_2$N-t-Bu][MgCl]$_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 4.5 L of toluene, 1.14 kg of (Me$_4$C$_5$H)SiMe$_2$NH-t-Bu, and 3.46 kg of 2 M i-PrMgCl in Et$_2$O. The mixture was then heated, and the ether allowed to boil off into a trap cooled to −78° C. After four hours, the temperature of the mixture had reached 75° C. At the end of this time, the heater was turned off and DME was added to the hot, stirring solution, resulting in the formation of a white solid. The solution was allowed to cool to room temperature, the material was allowed to settle, and the supernatant was decanted from the solid. The [(Me$_4$C$_5$)SiMe$_2$N-t-Bu][MgCl]$_2$ was left in R-2 as an off-white solid.

Part 3: Preparation of [η$^5$-Me$_4$C$_5$)SiMe$_2$N-t-Bu ]TiMe$_2$

The materials in R-1 and R-2 were slurried in DME (3 L of DME in R-1 and 5 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color, and the temperature in R-2 rose from 21° C. to 32° C. After 20 minutes, 160 mL of CH$_2$Cl$_2$ was added through a dropping funnel, resulting in a color change to green/brown. This was followed by the addition of 3.46 kg of 3 M MeMgCl in THF, which caused a temperature increase from 22° C. to 5° C. The mixture was stirred for 30 minutes, then 6 L of solvent was removed under vacuum. Isopar™ E hydrocarbon (6 L) was added to the flask. This vacuum/solvent addition cycle was repeated, with 4 L of solvent removed and 5 L of Isopar™ E hydrocarbon added. In the final vacuum step, an additional 1.2 L of solvent was removed. The material was allowed to settle overnight, then the liquid layer decanted into another 30 L glass kettle (R-3). The solvent in R-3 was removed under vacuum to leave a brown solid, which was re-extracted with Isopar E; this material was transferred into a storage cylinder. Analysis indicated that the solution (17.23 L) was 0.1534 M in titanium; this is equal to 2.644 moles of [(η$^5$-Me$_4$C$_5$)SiMe$_2$N-t-Bu]TiMe$_2$. The remaining solids in R-2 were further extracted with Isopar™ E hydrocarbon, the solution was transferred to R-3, then dried under vacuum and re-extracted with Isopar™ E hydrocarbon. This solution was transferred to storage bottles; analysis indicated a concentration of 0.1403 M titanium and a volume of 4.3 L (0.6032 moles [(η$^5$-Me$_4$C$_5$)SiMe$_2$N-t-Bu]TiMe$_2$). This gives an overall yield of 3.2469 moles of [(η$^5$-Me$_4$C$_5$) SiMe$_2$N-t-Bu]TiMe$_2$, or 1063 g. This is a 72 percent yield overall based on the titanium added as TiCl$_3$.

Catalyst Preparation Two

Part 1: Preparation of TiCl$_3$(DME)$_{1.5}$

The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5.2 L). In the drybox, 300 g of TiCl$_3$ was weighed into an equalizing powder addition funnel; the funnel was capped, removed from the drybox, and put on the reaction kettle in place of the stopper. The TiCl$_3$ was added over about 10 minutes with stirring. After the addition was completed, additional DME was used to wash the rest of the TiCl$_3$ into the flask. This process was then repeated with 325 g of additional TiCl$_3$, giving a total of 625 g. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The TiCl$_3$(DME)1.5 was left in R-1 as a pale blue solid.

Part 2: Preparation of [(Me$_4$C$_5$)SiMe$_2$N-t-Bu][MgCl]$_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 7 L of toluene, 3.09 kg of 2.17 M i-PrMgCl in Et$_2$O, 250 mL of THF, and 1.03 kg of (Me$_4$C$_5$H)SiMe$_2$NH-t-Bu. The mixture was then heated, and the ether allowed to boil off into a trap cooled to −78° C. After three hours, the temperature of the mixture had reached 80° C., at which time a white precipitate formed. The temperature was then increased to 90° C. over 30 minutes and held at this temperature for 2 hours. At the end of this time, the heater was turned off, and 2 L of DME was added to the hot, stirring solution, resulting in the formation of additional precipitate. The solution was allowed to cool to room temperature, the material was allowed to settle, and the supernatant was decanted from the solid. An additional wash was done by adding toluene, stirring for several minutes, allowing the solids to settle, and decanting the toluene solution. The [(Me$_4$C$_5$)SiMe$_2$N-t-Bu] [MgCl]$_2$ was left in R-2 as an off-white solid.

Part 3: Preparation of [(η5-Me$_4$C$_5$)SiMe$_2$N-t-Bu]Ti(η$^4$-1, 3-pentadiene)

The materials in R-1 and R-2 were slurried in DME (the total volumes of the mixtures were approximately 5 L in R-1 and 12 L in R-2). The contents of R-1 were transferred to R-2 using a transfer tube connected to the bottom valve of the 10 L flask and one of the head openings in the 30 L flask.

The remaining material in R-1 was washed over using additional DME. The mixture darkened quickly to a deep red/brown color. After 15 minutes, 1050 mL of 1,3-pentadiene and 2.60 kg of 2.03 M n-BuMgCl in THF were added simultaneously. The maximum temperature reached in the flask during this addition was 53° C. The mixture was stirred for 2 hours, then approximately 11 L of solvent was removed under vacuum. Hexane was then added to the flask to a total volume of 22 L. The material was allowed to settle, and the liquid layer ($_{12}$ L) was decanted into another 30 L glass kettle (R-3). An additional 15 liters of product solution was collected by adding hexane to R-2, stirring for 50 minutes, again allowing to settle, and decanting. This material was combined with the first extract in R-3. The solvent in R-3 was removed under vacuum to leave a red/black solid, which was then extracted with toluene. This material was transferred into a storage cylinder. Analysis indicated that the solution (11.75 L) was 0.255 M in titanium; this is equal to 3.0 moles of $[(\eta^5\text{-Me}_4\text{C}_5)\text{SiMe}_2\text{N-t-Bu}]\text{Ti}(\eta^4\text{-1,3-}$ pentadiene) or 1095 g. This is a 74 percent yield based on the titanium added as $\text{TiCl}_3$.

Polymers A–D and Waxes 1–3 were produced in a solution polymerization process using a continuously stirred reactor. Polymers A, B, and C, and Wax 1 were each stabilized with 1250 ppm calcium stearate, 500 ppm Irganox™ 1076 hindered polyphenol stabilizer (available from Ciba-Geigy Corporation), and 800 ppm PEPQ (tetrakis(2, 4-di-t-butylphenyl)-4,4'-biphenylene diphosphonite) (available from Clariant Corporation). Polymer D and Waxes 2 and 3 were each stabilized with 500 ppm Irgano™ 1076 hindered polyphenol stabilizer, 800 ppm PEPQ, and 100 ppm water (as a catalyst kill agent).

The ethylene and the hydrogen were combined into one stream before being introduced into the diluent mixture, a mixture of $C_8$–$C_{10}$ saturated hydrocarbons, for example, ISOPAR-E hydrocarbon mixture (available from Exxon Chemical Company) and the comonomer. For polymers A, B, C, and D and for Waxes 1 and 2 the comonomer was 1-octene; Wax 3 had no comonomer. The reactor feed mixture was continuously injected into the reactor.

The metal complex and cocatalysts were combined into a single stream and were also continuously injected into the reactor. For Polymers A, B, and C and Wax 1, the catalyst was as prepared in Catalyst Preparation One set forth above. For Polymer D and Waxes 2 and 3, the catalyst was as prepared in Catalyst Preparation Two set forth above. For each Polymer and Wax, the co-catalyst was tris (pentafluorophenyl)borane, available as a 3 wt-% solution in Isopar™-E mixed hydrocarbon, from Boulder Scientific. Aluminum was provided in the form of a solution of modified methylalumoxane (MMAO Type 3A) in heptane, which is available at a 2 wt-% aluminum concentration from Akzo Nobel Chemical Inc.

Sufficient residence time was allowed for the metal complex and cocatalyst to react prior to introduction into the polymerization reactor. In each polymerization reaction, the reactor pressure was held constant at about 475 psig (3.3 MPa). Ethylene content of the reactor, in each polymerization, after reaching steady state, was maintained at the conditions specified in Table Five.

After polymerization, the reactor exit stream was introduced into a separator where the molten polymer is separated from the unreacted comonomer(s), unreacted ethylene, unreacted hydrogen, and diluent mixture stream. The molten polymer was subsequently strand chopped or pelletized, and, after being cooled in a water bath or pelletizer, the solid pellets were collected. Table Five describes the polymerization conditions and the resultant polymer properties.

Polymers E and F and Wax 4 were produced in a solution polymerization process using a well-mixed recirculating loop reactor. Each polymer was stabilized with 2000 ppm Irgano™ 1076 hindered polyphenol stabilizer (available from Ciba-Geigy Corporation) and 35 ppm deionized water (as a catalyst kill agent).

The ethylene and the hydrogen (as well as any ethylene and hydrogen which were recycled from the separator, were combined into one stream before being introduced into the diluent mixture, a mixture of $C_8$–$C_{10}$ saturated hydrocarbons, for example, Isopar™-E hydrocarbon (available from Exxon Chemical Company) and the comonomer 1-octene.

The metal complex and cocatalysts were combined into a single stream and were also continuously injected into the reactor. The catalyst was as prepared in Catalyst Description Two set forth above; the primary cocatalyst was tri (pentafluorophenyl)borane, available from Boulder Scientific as a 3 wt percent solution in ISOPAR-E mixed hydrocarbon; and the secondary cocatalyst was modified methylalumoxane (MMAO Type 3A), available from Akzo Nobel Chemical Inc. as a solution in heptane having 2 wt percent aluminum.

Sufficient residence time was allowed for the metal complex and cocatalyst to react prior to introduction into the polymerization reactor. The reactor pressure was held constant at about 475 psig (3.3 MPa).

After polymerization, the reactor exit stream was introduced into a separator where the molten polymer was separated from the unreacted comonomer(s), unreacted ethylene, unreacted hydrogen, and diluent mixture stream, which was in turn recycled for combination with fresh comonomer, ethylene, hydrogen, and diluent, for introduction into the reactor. The molten polymer was subsequently strand chopped or pelletized, and, after being cooled in a water bath or pelletizer, the solid pellets were collected. Table Six describes the polymerization conditions and the resultant polymer properties.

TABLE V

|  | Polymer A | Polymer B | Polymer C | Polymer D | Wax 1 | Wax 2 | Wax 3 |
| --- | --- | --- | --- | --- | --- | --- | --- |
| Ethylene feed (lb/hr (kg/hr)) | 2.0 | 2.0 | 2.0 | 3.0 | 3.0 | 3.0 | 3.0 |
|  | (0.9) | (0.9) | (0.9) | (1.4) | (1.4) | (1.4) | (1.4) |
| Comonomer:olefin ratio (mole percent) | 12.40 | 8.50 | 12.50 | 9.10 | 0.40 | 1.24 | 0.00 |
| Hydrogen:ethylene ratio (mole percent) | 0.26 | 0.66 | 1.26 | 0.54 | 1.60 | 2.14 | 2.14 |
| Diluent:ethylene ratio (weight basis) | 10.60 | 9.30 | 11.10 | 9.99 | 5.90 | 7.69 | 7.70 |
| Catalyst metal concentration (ppm) | 4 | 2 | 4 | 3 | 5 | 32 | 32 |
| Catalyst flow rate (lb/hr (kg/hr)) | 0.272 | 0.386 | 0.428 | 0.450 | 0.626 | 0.304 | 0.294 |
|  | (0.123) | (0.175) | (0.194) | (0.205) | (0.285) | (0.138) | (0.134) |
| Co-catalyst concentration (ppm) | 88 | 44 | 88 | 88 | 353 | 1430 | 1430 |

TABLE V-continued

|  | Polymer A | Polymer B | Polymer C | Polymer D | Wax 1 | Wax 2 | Wax 3 |
|---|---|---|---|---|---|---|---|
| Co-catalyst flow rate (lb/hr (kg/hr)) | 0.396 (0.180) | 0.561 (0.254) | 0.624 (0.283) | 0.490 (0.223) | 0.284 (0.129) | 0.219 (0.100) | 0.211 (0.096) |
| Aluminum concentration (ppm) | 10 | 5 | 10 | 9.8 | 20 | 120.0 | 120.0 |
| Aluminum flow rate (lb/hr) | 0.375 (0.170) | 0.528 (0.240) | 0.590 (0.268) | 0.468 (0.213) | 0.534 (0.243) | 0.323 (0.147) | 0.311 (0.141) |
| Reactor temperature (° C.) | 110 | 110 | 110 | 110 | 140 | 110 | 110 |
| Ethylene concentration in reactor exit stream (wt-%) | 1.80 | 2.99 | 1.65 | 1.71 | 4.41 | 1.80 | 1.69 |
| Polymer density (g/cm$^3$) | 0.875 | 0.897 | 0.870 | 0.883 | 0.968 | 0.948 | 0.960 |
| Polymer melt viscosity at 177° C. (350° F.) (cPs) | 39,000* | 5200 | 355 | 5000 | 395 | 350 | 512 |
| Polymer melt index ($I_2$ at 190° C.) | 246 | 1500* | 16,000* | 1500* | 15,000* | 16,000* | 12,000* |
| Polymer Mw | 30,100 | 15,600 | 7,900 | 16,200 | 7,300 | 6,900 | 7,400 |
| Polymer Mn | 17,100 | 8,700 | 4,300 | 8,200 | 3,700 | 3,200 | 3,200 |
| Polymer Mw/Mn | 1.76 | 1.79 | 1.84 | 1.98 | 1.97 | 2.16 | 2.31 |
| Peak crystallization temperature by DSC (° C.) | 55.73 | 59.05 | 78.57 | 69.27 | 114.76 | 109.88 | 116.39 |
| Peak melting temperature by DSC (° C.) | 68 | 67 | 91.04 | 81.97 | 127.6 | 120.5 | 131.11 |
| Total percent crystallinity by DSC | 18.94 | 19.55 | 36.3 | 28.18 | 79.62 | 72.81 | 72.84 |

*Calculated on the basis of melt viscosity correlations in accordance with the formula:
$I_2 = 3.6126(10^{\log(\eta)-6.6928)/-1.1363}) - 9.3185$, where $\eta$ = melt viscosity at 177° C. (350° F.)

TABLE VI

|  | Polymer E | Polymer F | Wax 4 |
|---|---|---|---|
| Ethylene fresh feed rate (lbs/hr (kg/hr)) | 140 (63.5) | 140 (63.5) | 140 (63.5) |
| Total ethylene feed rate (lbs/hr (kg/hr)) | 146.2 (66.32) | 146.17 | 146.5 (66.45) |
| Fresh octene feed rate (lbs/hr (kg/hr)) | 45.4 (20.6) | 49.5 (22.4) | 12.67 (5.75) |
| Total octene feed rate (lbs/hr (kg/hr)) | Not determined | 112 (50.8) | 32.9 (14.9) |
| Total octene concentration (wt-%) | Not determined | 11.4 | 3.36 |
| Fresh hydrogen feed rate (standard cm$^3$/min.) | 4025 | 5350 | 16100 |
| Solvent and octene feed rate (lbs/hr (kg/hr)) | 840 (381) | 839.4 (381) | 840 (381) |
| Ethylene conversion rate (wt-%) | 90.7 | 90.3 | 88.26 |
| Reactor temperature (° C.) | 109.86 | 119.8 | 134.3 |
| Feed temperature (° C.) | 15 | 15 | 15.3 |
| Catalyst concentration (ppm) | 70 | 70 | 70 |
| Catalyst flow rate (lbs/hr (kg/hr)) | 0.725 (0.329) | 1.265 | 4.6 (2.1) |
| Primary cocatalyst concentration (ppm) | 1200 | 2031 | 1998 |
| Primary cocatalyst flow rate (lbs/hr (kg/hr)) | 2.96 (1.34) | 1.635 | 5.86 (2.66) |
| Titanium:boron molar ratio | 2.96 | 3.48 | 2.897 |
| Secondary cocatalyst concentration (ppm) | 198 | 198 | 198 |
| Secondary cocatalyst flow rate (lbs/hr (kg/hr)) | 0.718 (0.326) | 1.258 (0.571) | 3.7 (1.7) |
| Titanium:aluminum molar ratio | 5 | 4.986 | 4.037 |
| Product density (g/cm$^3$) | 0.8926 | 0.8925 | 0.9369 |
| Product melt viscosity at 177° C. (350° F.) | 12,500 | 4,000 | 400 |
| Polymer melt index ($I_2$ at 190° C.)* | 686* | 1,900* | 14,000* |
| Polymer $M_n$ | 12,300* | 8,900* | 4,700* |

*Calculated on the basis of melt viscosity correlations in accordance with the formulas:
$I_2 = 3.6126(10^{\log(\eta)-6.6928)/-1.1363}) - 9.3185$,
$M_n = 10^{[(\log\eta+10.46)/3.56]}$ where $\eta$=melt viscosity at 177° C. (350° F.).

Examples 1–4, 12–14 and Comparative Examples A & B were foamed with a Nordson Foam Melt 130 using the application conditions depicted in Tables 7 & 9. The observations regarding the foam quality are noted following the tables.

TABLE 7

| Compounded Examples 1–4 | | | | |
|---|---|---|---|---|
|  | Example 1 | Example 2 | Example 3 | Example 4 |
| Ingredients (wt-%) | | | | |
| Insite EG 8100 | 20 | | | |
| Insite EG 8200 | | 25 | | |
| Exact 5008 | | | 25 | |
| Insite SM 8400 | | | | 30 |
| Paraflint H4 | 20 | | 20 | 20 |
| PX-100 HMP Wax | | 20 | | |
| Kaydol oil | 59.5 | 54 | 54.5 | 49.5 |

TABLE 7-continued

Compounded Examples 1-4

|  | Example 1 | Example 2 | Example 3 | Example 4 |
|---|---|---|---|---|
| Irganox 1010 | 0.5 | 0.5 | 0.5 | 0.5 |
| Viscosity @ 135° C. (275° F.) | 15,000 cPs | 9,750 cPs | 8,750 cPs | 3,600 cPs |
| Mettler Softening Point ° C. | 103° C. (218° F.) | 103° C. (217° F.) | 101° C. (214° F.) | 104° C. (220° F.) |
| Application Conditions |  |  |  |  |
| Temperature (° C.) 1 | 135° C. (275° F.) | 245 | 250 | 240 |
| Temperature (° C.) 2 | 121° C. (250° F.) |  |  |  |
| Nitrogen Pressure | 5 psi | 5 psi | 5 psi | 4.5–5 psi |
| Air/Hydraulic Pressure | 800–900 psi | 1000 psi | 1000 psi | 900–1000 |
| Density Reduction 1 | 62% | 61% | 57% | 65% |
| Density Reduction 2 | 66% |  |  |  |

TABLE 8

Compounded Examples 5-11

|  | Example 5 | Example 6 | Example 7 | Example 8 | Example 9 | Example 10 | Example 11 |
|---|---|---|---|---|---|---|---|
| Ingredients (wt-%) |  |  |  |  |  |  |  |
| Insite EG 8100 | 20 | 20 |  |  |  | 20 |  |
| Insite EG 8200 |  |  |  | 25 |  |  |  |
| PL 1840 |  |  | 20 |  |  |  |  |
| insite SM 8400 |  |  |  |  | 30 |  | 30 |
| Paraflint H4 |  | 20 |  | 20 | 20 |  |  |
| PX-100 HMP Wax |  |  |  |  |  | 20 | 20 |
| Marcus 200 | 20 |  | 20 |  |  |  |  |
| N-500-HT |  | 60 |  |  |  |  |  |
| Kaydol oil | 60 |  | 60 | 54.5 | 49.5 | 59.5 | 49.5 |
| Irganox 1010 |  |  |  | 0.5 | 0.5 | 0.5 | 0.5 |
| Viscosity @ 135° C. (275° F.) | 16,900 | 16,450 | 19,200 | 10,570 | 4,340 | 14,650 | 4044 |
| (cPs) Softening Point (° C.) | 109° C. (228° F.) | 102° C. (216° F.) | 109° C. (229° F.) | 103° C. (217° F.) | 104° C. (220° F.) | 99° C. (211° F.) | 101° C. (214° F.) |

TABLE 9

Uncompounded Examples 12-14 & Comparative Examples A & B

|  | Example 12 | Example 13 | Example 14 | Comparative A | Comparative B |
|---|---|---|---|---|---|
| XUR-1567-5337-115 | 100% |  |  |  |  |
| 0.890 g/cm³ |  |  |  |  |  |
| 5000 cPs @ 177° C. (350° F.) |  |  |  |  |  |
| C10R6 |  | 100% |  |  |  |
| 0.881 g/cm³ |  |  |  |  |  |
| 5000 cPs @ 177° C. (350° F.) |  |  |  |  |  |
| C10R5 |  |  | 100% |  |  |
| 0.873 g/cm³ |  |  |  |  |  |
| 5000 cPs @ 177° C. (350° F.) |  |  |  |  |  |
| Epolene C-10 |  |  |  | 100% |  |
| Rextac 2715 |  |  |  |  | 100% |
| Application Conditions |  |  |  |  |  |
| Temperature (° C.) 1 | 160° C. (320° F.) | 127° C. (260° F.) | 127° C. (260° F.) | 127° C. (260° F.) | 127° C. (260° F.) |
| Temperature (° C.) 2 | 260 |  |  |  |  |
| Nitrogen Pressure | 5 psi | 5 psi | 5 psi | 5 psi | 5 psi |
| Air/Hydraulic Pressure | 1000 psi | 1000 psi | 1000 psi | 1000 psi | 1,100 psi |
| Density Reduction 1 | 60% | 60% | 59% | 54% | 59% |
| Density Reduction 2 | 69% |  |  |  |  |
| Strippable | Yes | Yes | Yes | Fell Off | No |
| Mettle Softening Pt. (° C.) | 97° C. (206° F.) | 94° C. (202° F.) | 82° C. (180° F.) | 100° C. (212° F.) | 127° C. (260° F.) |

Example 1—exhibited good foam quality at 135° C. (275° F.) and excellent foam quality at 121° C. (250° F.). The resulting foam was easily and cleanly strippable from painted metal and ABS plastic.

Example 2—white foam with desirable small cell structure. The resulting foam was easily and cleanly strippable from painted metal and ABS plastic.

Example 3—white foam with desirable small cell structure. A slight residue was exhibited on one test surface after stripping the foam from (ABS or painted metal?). The set time also appears to be slower which is surmised to be attributable to the low density (0.865 g/cm$^2$) of the metallocene polyolefin.

Example 4—white foam with good set-up. The foam exhibited a small cell structure and good stability. Due to the lower product viscosity, a lower application temperature was achievable with the Nordson Foam Melt 130.

Examples 5–11—exhibit the use of various waxes and oil to achieve compositions having a low viscosity and high Mettler Softening Point.

Examples 12–14—exhibit foaming a neat, uncompounded ethylene/α-olefin for use as a cabinet sealant. Example 12 resulted in a white foam that was easily removable from painted metal and ABS without leaving a residue. Example 13 was slightly slower setting in comparison with Example 12, yet maintained "easy-clean" properties. Example 14 was slower setting yet and a small amount of residue was occasionally present on the appliance housing after stripping.

Comparative Example A—lower foam reduction. Foam shrinkage resulted in the premature release of the foam from the painted metal. The foam fell off a vertically-hung panel upon cooling.

Comparative Example B—too high of application temperature. The foam was not cleanly removable surmised to be caused by cohesive strength of the foam being lower than the bond strength.

Examples 2 and 12–14 retained their shape after aging. The foams comprising the neat ethylene/α-olefin exhibited better cell retention and rebound than the compounded samples tested.

We claim:

1. A foamable composition comprising a thermoplastic material comprising:
   a) from about 10 wt-% to about 80 wt-% of at least one homogeneous ethylene α-olefin interpolymer; and
   b) from 20 wt-% to about 90 wt-% of at least one ingredient selected from the group consisting of plasticizers, waxes, tackifiers, and mixtures thereof; wherein said composition has a viscosity of less than 100,000 cPs at 400° F. and upon foaming said composition is reduced in density by an amount ranging from about 20 wt-% to about 80 wt -%.

2. The foamable composition of claim 1 wherein the thermoplastic material has a softening point of at least about 70° C.

3. The foamable composition of claim 1 wherein the at least one interpolymer of ethylene has a density of from about 0.870 to about 0.900 g/cm$^2$.

4. The foamable composition of claim 1 wherein said composition comprises a blend of at least two interpolymers of ethylene wherein the blend has a density of from about 0.870 to about 0.900 g/cm$^2$.

5. The foamable composition of claim 1 wherein the at least one interpolymer of ethylene has a melt index of from about 0.5 to about 200 g/10 min.

6. The foamable of claim 1 wherein said liquid plasticizer in an oil.

7. The foamable composition of claim 1 wherein said composition after foaming is substantially nontacky.

8. The foamable composition of claim 1 wherein said composition after foaming is pressure sensitive.

9. The foamable composition of claim 1 wherein said composition after foaming is elastomeric.

10. The composition of claim 1 wherein the ethylene α-olefin interpolymer has a polydispersity of less than about 2.5.

11. A method of foaming comprising the steps of:
    a) providing a molten thermoplastic composition comprising from about 10 wt-% to about 100 wt-% of at least one ethylene α-olefin interpolymer and from 0 to about 90 wt-% of a least one ingredient selected from the group consisting of liquid plasticizers, waxes, tackifiers, and mixtures thereof,
    b) forming a solution of said thermoplastic composition with a gas; and
    c) releasing said solution from a dispensing device at a temperature ranging from about 90° C. to about 150° C.

12. The method of claim 11 wherein the thermoplastic composition has a softening point of at least 70° C.

13. The method of claim 11 wherein said composition comprises a blend of at least two interpolymers of ethylene.

14. The method of claim 11 wherein said thermoplastic composition is released onto an appliance housing having at least one void.

15. The method of claim 11 wherein said thermoplastic composition is released onto an absorbent disposable article.

16. The composition of claim 11 wherein the ethylene α-olefin interpolymer has a polydispersity of less than about 2.5.

17. An article comprising a substrate having at least one void wherein the foamable composition of claim 1 is applied to said void.

18. An article comprising a substrate and coated on at least one surface of the substrate is the foamable composition of claim 1.

19. A foam comprising a thermoplastic material consisting essentially of at least one homogeneous ethylene α-olefin interpolymer having a number average molecular weight of less than 40,000.

20. The foam of claim 19 wherein the density of the homogeneous ethylene α-olefin interpolymer ranges from 0.885 to 0.905 g/cm$^2$.

21. A method of foaming comprising the steps of:
    a) providing a molten thermoplastic composition selected from the group consisting of;
       i) a composition comprising a from about 10 wt-% to about 80 wt-% of at least one homogeneous interpolymer of ethylene having at least one $C_3$–$C_{20}$ α-olefin having a polydispersity less than about 2.5 and from 20 wt-% to about 90 wt-% of at least one ingredient selected from the group consisting of plasticizers, waxes, tackifiers, and mixtures thereof; wherein said composition has a viscosity of less than 100,000 cPs at 400° F.; and
       ii) a composition consisting essentially of at least one homogeneous ethylene α-olefin interpolymer having a number average molecular weight of less than 40,000;
    b) forming a solution of said thermoplastic composition with a gas; and
    c) releasing said solution from a dispensing device forming a foam.

22. The composition of claim 21 wherein the ethylene α-olefin interpolymer has a polydispersity of less than about 2.5.

* * * * *